J. E. CRISP.
Paper-Collar Dies.
No. 148,812. Patented March 24, 1874.
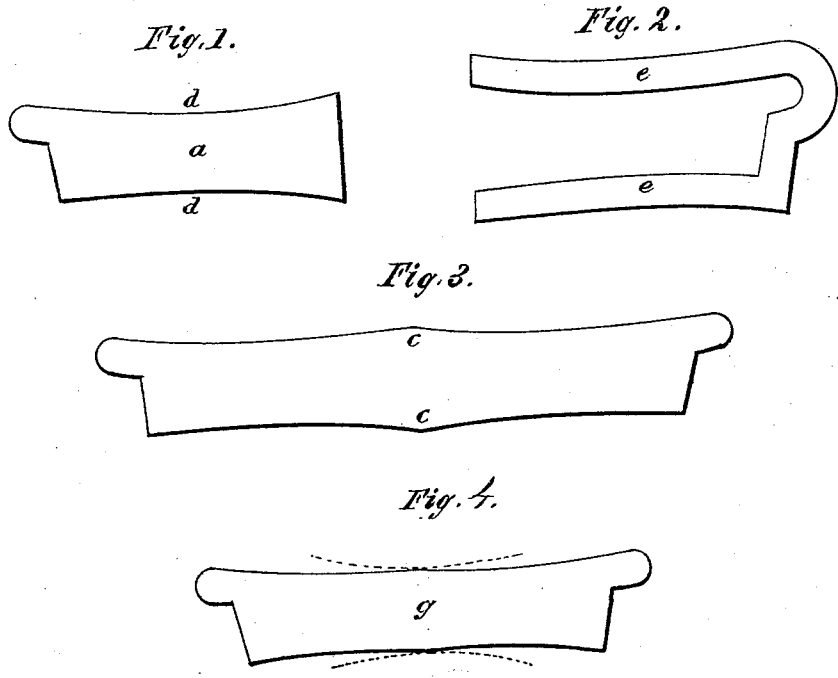

United States Patent Office.

JOSEPH E. CRISP, OF CHARLESTOWN, ASSIGNOR TO THE REVERSIBLE-COLLAR COMPANY, OF BOSTON, MASSACHUSETTS.

IMPROVEMENT IN PAPER-COLLAR DIES.

Specification forming part of Letters Patent No. 148,812, dated March 24, 1874; application filed August 23, 1873.

*To all whom it may concern:*

Be it known that I, J. E. CRISP, of Charlestown, in the county of Middlesex and State of Massachusetts, have invented certain new and useful Improvements in Paper-Collar Dies; and I do hereby declare that the following is a full, clear, and exact description thereof, reference being had to the accompanying drawings and to the letters of reference marked thereon, which form a part of this specification.

The nature of my invention relates to an improvement in dies for cutting paper collars; and it consists in making the die just half the length of the longest collar of the series to be cut, so that its cut will terminate in the center of the collar, the narrowest part of the die being less than one-half the length of the shortest collar of the series to be cut.

Figure 1 is a plan view of the male die. Fig. 2 is a similar view of the female die. Fig. 3 is a plan view of the longest collar of the series. Fig. 4 is a similar view of the shortest collar.

$a$ represents my die, made solid, and which will cut just one-half of the longest collar of the series to be cut, its cut terminating at the points $c\ c$, Fig. 3, in the center of the collar. This die and its matrix $e$ may be of any desired shape or pattern, but will be less than one-half the length of the collar $g$—the shortest of the series to be cut—at its narrowest point, from $d$ to $d$.

It will be readily seen that with one right and one left hand die, properly arranged and secured to the machine in any of the various manners known to the trade, all the sizes in a range of collars can be cut, either by adjusting the dies nearer to or farther from each other, or by variations of the length of feed.

A pair of these dies can be made and placed for about the cost of one solid die, with this advantage, that the solid die will cut but one size, while the pair will cut all sizes.

In using these dies, the longest collars will be widest at the center, while the shortest will be narrowest, as shown in Figs. 3 and 4.

Having thus described my invention, I claim—

A die for cutting paper collars, made one-half the length of the longest collar of the series to be cut, and which is adapted to cutting collars of different sizes and shapes, substantially as set forth.

In testimony that I claim the foregoing as my own I affix my signature in presence of two witnesses.

J. E. CRISP.

Witnesses:
  A. J. BAILEY,
  JAMES W. HAVILAND.